United States Patent [19]

Semar

[11] Patent Number: 5,589,059
[45] Date of Patent: Dec. 31, 1996

[54] OIL FILTER ADAPTER SYSTEM INCORPORATING AN ACCESSIBLE FILTER ELEMENT

[76] Inventor: James E. Semar, P.O. Box 9412, New Iberia, La. 70562

[21] Appl. No.: 481,106

[22] Filed: Jun. 7, 1995

[51] Int. Cl.$^6$ ................................................ B01D 35/153
[52] U.S. Cl. .................... 210/109; 210/136; 210/138; 210/168; 210/416.5; 210/418; 210/439; 210/440
[58] Field of Search ................................ 210/136, 168, 210/416.5, 109, 138, 418, 439, 440; 123/196 A, 196 S; 184/6.3, 6.24, 32

[56] References Cited

U.S. PATENT DOCUMENTS

| | | | |
|---|---|---|---|
| 3,167,507 | 1/1965 | Burhans et al. | 210/136 |
| 4,359,140 | 11/1982 | Shreve | 184/6.3 |
| 4,492,632 | 1/1985 | Mattson | 210/168 |
| 4,825,826 | 5/1989 | Andres | 184/6.3 |
| 5,511,522 | 4/1996 | Tran | 123/196 S |

*Primary Examiner*—Matthew O. Savage
*Attorney, Agent, or Firm*—Gunn & Associates, P. C.

[57] ABSTRACT

The present disclosure sets forth an adapter for installation on an automobile engine in lieu of a disposable cartridge filter. The adapter includes inlet and outlet fittings. The inlet and outlet fittings connect through a pair of flexible hoses to a raised filter housing installed at an elevated location in the engine compartment. The system also includes an oil reservoir which accumulates oil under pressure where the oil under pressure is stored until engine starting. This enhances lubrication within the engine at the upper portions thereof to avoid dry starting which occurs when the oil otherwise settles to the bottom of the engine. The reservoir in conjunction with the filter housing operates with selected valves and checkvalves so a hydrostatic head of oil pressure is achieved even when the engine is not operating.

15 Claims, 3 Drawing Sheets

OIL FILTER ADAPTER SYSTEM INCORPORATING AN ACCESSIBLE FILTER ELEMENT

BACKGROUND OF THE DISCLOSURE

The present disclosure is directed to an oil filter system and in particular to an oil filter system which can be attached to an automobile incorporating an oil filter which is located below the engine. It is common to install oil filters at a location below an engine where servicing is difficult. To be sure, servicing is easily accomplished providing the vehicle can be elevated on a car lift, raised above the ground, and elevated sufficiently to permit personnel to walk under the car. This makes servicing difficult without the expensive equipment. Moreover, servicing is normally accomplished by unthreading a cartridge which threads into the lower side of the engine. When that is done, the engine oil filter must be first unthreaded, thrown away and replaced with a new cartridge. The cartridge includes the filter constructed in integral fashion with an external sleeve terminating at a set of external threads at the upper end. That requires snug fitting in the threaded receptacle. If a proper seat is not formed, leakage will occur on the filter exterior. With practice and with skill, personnel can normally install the replacement cartridge having an integral filter correctly. It is done, however, with a measure of difficulty.

The present disclosure sets forth an oil filter installation system which can be mounted in a vehicle so the filter can be installed through the raised hood, and the filter is then easily accessed for easy installation. A car lift is not required In addition, the present disclosure sets forth a system of hoses and valves which connect from the engine to the more convenient location, thereby permitting easier installation and further makes available features which reduce engine wear significantly. This is accomplished through the hoses or connective lines extending to the filter.

The most vulnerable moment for engine operation occurs after the vehicle has sat over night, or perhaps longer and all of the engine oil lubricant settles to the sump or oil pan at the bottom of the engine. The parts at the highest regions of the engine are substantially dry. This especially keeps the cam shaft, cam followers, lift rods and rocker arms on the valve system dry. When the engine is first started, the upper engine parts become lubricated after a few seconds. It takes a moment or two for the engine oil pump to pull oil from the sump and lift it through the flowpath to the upper parts of the engine. The present disclosure sets forth a structure in which a substantial portion of oil is kept at a higher elevation in the engine and is pressurized prior to starting so it distributes at higher pressure more rapidly into the upper parts of the engine. In part, this is accomplished through the use of solenoid control valves and a reservoir incorporated with the present system.

The present system provides a boost to the oil pressure and delivers a flow of oil immediately at the time that the engine is operated. The present system quickly distributes oil under pressure to the upper parts of the engine. The time lag of several seconds is reduced.

One other aspect worthy of mention in the use and operation of the present system is the ability of the system to deliver lubricating oil to a filter element which can easily be removed. Because it is more readily accessible and is removed from an adapter housing, the filter element is more likely to be serviced when required rather than waiting until a carlift facility is found. Home servicing is more easily accomplished. Servicing without special equipment can then be done. Servicing at a time and place where expensive equipment is included is thereby avoided.

The present invention is summarized as an adapter which is mounted on the engine at the location of the disposable threaded cartridge filter used heretofore. The adapter threads to and is permanently mounted on the engine. The adapter includes inlet and outlet ports. The two ports connect with hoses extending upwardly to an oil filter housing which is mounted in the engine compartment, preferably being mounted on the fender wall or at some other convenient hood covered location. The device includes inlet and outlet hose connections and has a chamber on the interior for receiving a disposable filter. The filter on the interior preferably plugs into and mounts in this housing. Flow lines are connected from the above mentioned adapter to this housing. One of the lines incorporates a reservoir which is pressure loaded. This reservoir holds a portion of lubricating oil. It is solenoid operated to enlarge the reservoir at the desired moment and to thereafter enhance pressure as a result of a reservoir spring and piston arrangement. The timing of this increase in pressure will be discussed in some detail. Through the use of appropriate check valves, solenoid operated valves and timers, system pressure can be maintained especially at the moment the engine is switched on.

BRIEF DESCRIPTION OF THE DRAWINGS

So that the manner in which the above recited features, advantages and objects of the present invention are attained and can be understood in detail, more particular description of the invention, briefly summarized above, may be had by reference to me embodiments thereof which are illustrated in the appended drawings.

DETAILED DESCRIPTION OF THE PREFERRED EMBODIMENT

Figure 1:
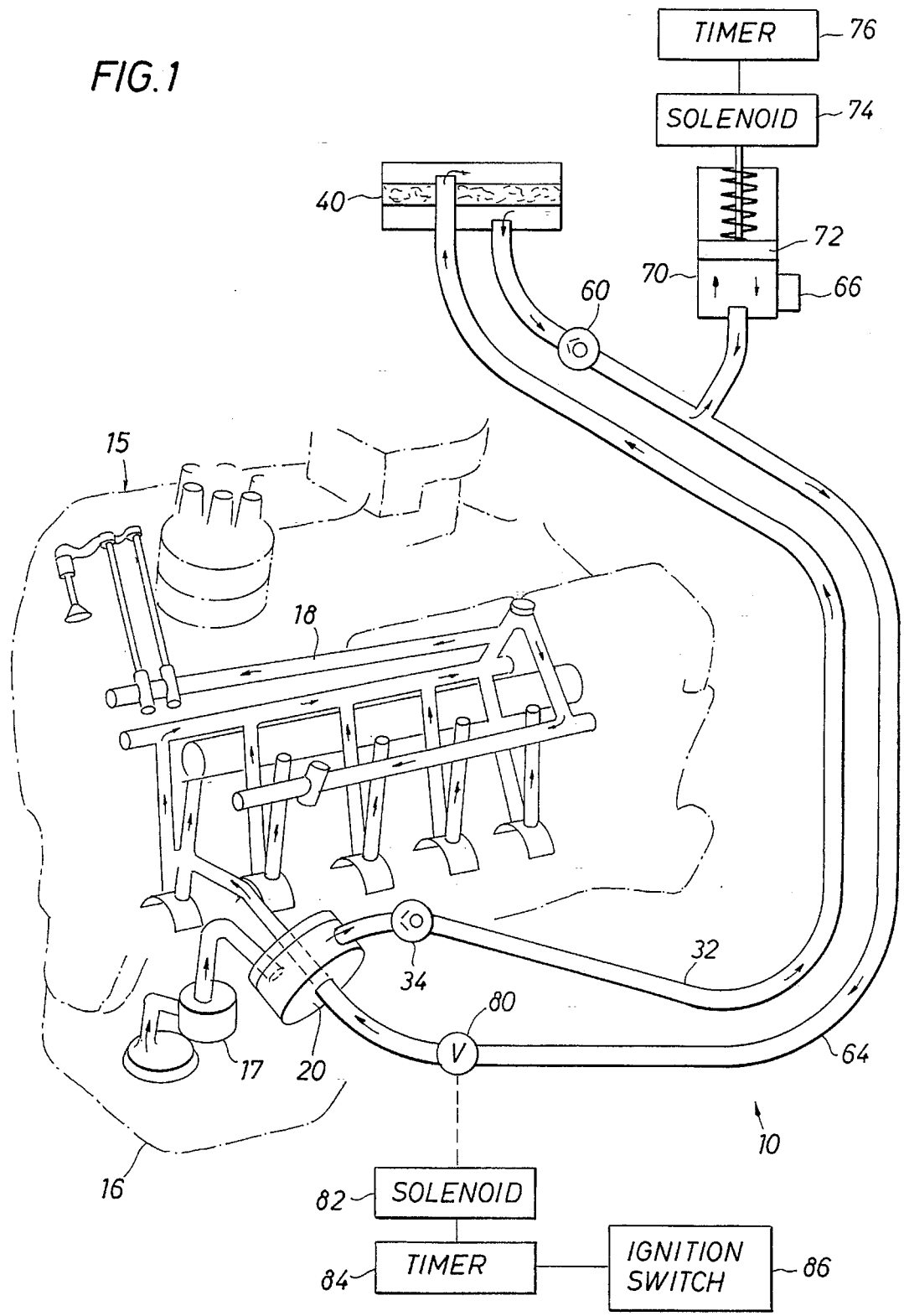
FIG. 1 is a system showing engine oil lubrication including the engine and various flowpaths within the engine all of which are provided with oil filtered through a filter supported and maintained by the adapter system of the present disclosure.

Attention is directed to FIG. 1 of the drawings where the numeral 10 generally identifies the adapter system of the present disclosure. It is connected with an automobile engine 15, the engine 15 having a number of oil flow lines which are located within the engine in phantom lines. The engine will be described to set the stage and provide the context of the present disclosure.

The engine includes an internal closed loop lubricating system. At the bottom of the engine, there is a sump in the oil pan 16. The oil lubrication system is powered by an engine oil pump 17. The oil pump 17 takes up oil from the sump and directs it through a number of flow channels. One channel is exemplified at 18. The oil flows along a passage in a cam shaft. Alternate constructions utilize oil lubrication distribution lines on the top of the engine cylinder heads. Typically, the engine is constructed with one or two banks of cylinder heads, a classic example being the V8 engine. In that instance there are left and right cylinder heads which are normally constructed with valve operating equipment. In a typical construction, there will be one or two overhead cam shafts. The overhead cam shafts are positioned above the cylinders and drive well known cam followers which ride on the cam lobe so that operating movement is delivered to valves through valve push rods. Without regard to the specifics of this oil distribution system, it is important that oil be distributed through the valve system so lubrication is maintained. In addition, it is common for the engine to lubricate the piston rods and wrist pins on the engine pistons. The piston rods connect with the crankshaft. The crankshaft is located in the oil pan so it runs in the oil or perhaps fully submerged. Positive crankshaft lubrication can also be provided.

As most engines are constructed today, the oil lubrication system is built to utilize a threaded cartridge which is a disposable element. At some nether region on the engine block, typically next to the oil pan, a cartridge filter is normally threaded and unthreaded for servicing. Typically, it includes a filter element on the interior and a closed housing around the filter element. Rather than use the conventional disposable filter element, the present disclosure provides an adapter which is threaded to the engine block at that location and which is permanently installed.

Figure 2:
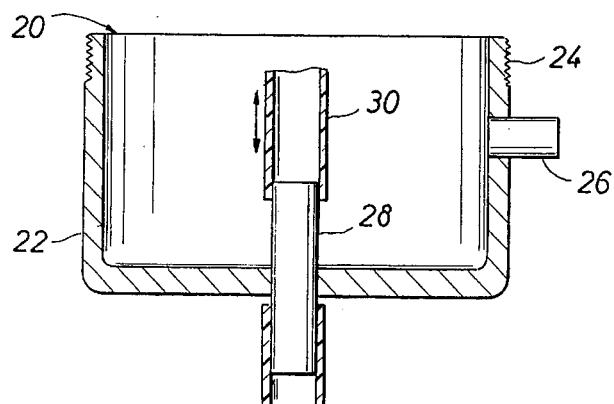
FIG. 2 is an enlarged sectional view of an adapter which is installed on the engine and left permanently so that the adapter enable connection of a pair of hoses.

An adapter 20 is shown in FIG. 2 of the drawings. It incorporates a cylindrical shell 22 which has a set of threads at the upper lip. The threads 24 and the diameter of the shell 22 match the customary replaceable filter. The adapter 20 is threaded in place of the filter and is left permanently. It is not necessary to make the adapter as long or tall as the conventional throw away cartridge filter. It can be relatively shallow. The adapter enables inlet and outlet connections to be achieved as will be explained. The adapter 20 threads into the engine at a location where it is connected to provide an inlet and outlet for oil flow. That aspect of the oil system is maintained. Low pressure oil from the oil sump is delivered into the housing 22 and is removed through an outlet 26. The outlet 26 is connected with a hose as will be described. The hose is routed upwardly as will be explained further. The adapter includes a centerline mounting inlet 28. The inlet 28 is located on the centerline of the adapter to enable an extension tube 30 to be telescoped upwardly or downwardly as required. It is moved upwardly or downwardly to enable the hose 30 to connect with the engine so that oil delivered under pressure after filtration is input back into the engine at the desired location. This is effectively the same route oil travels during use of a conventional filter cartridge. The moveable tube 30 provides the connection to enable control of the oil flowing in two paths. As will be understood, the oil pump 17 delivers oil under pressure into the adapter 20 and it is directed from the adapter through the fitting 26. After filtration, the oil is returned to the adapter 20. Oil is input through the inlet 28 and is delivered through the tubing 30. That returns oil into the engine for delivery along the engine lubrication channels. The adapter 20 thus includes the outlet and inlet as illustrated and they connect with two flexible hoses.

Figure 3:
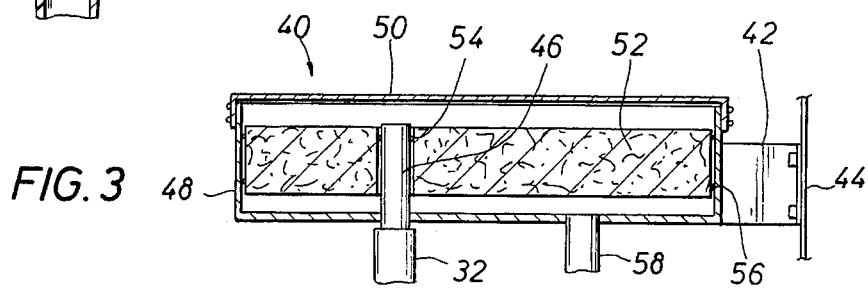
FIG. 3 is a sectional view through a filter housing for securing a disposable filter in the present invention.

Going now to FIG. 1 of the drawings, the adapter 20 is installed on the engine and connected to the flexible hose 32. The hose 32 supports a check valve 34 which is located as close as reasonably possible to the adapter 20. This valve prevents backflow out of the filter system above. The hose 32 extends to the filter housing 40. The filter housing 40 is better shown in FIG. 3. In FIG. 3 the filter housing 40 is supported with a mounting bracket 42 connecting with a fender wall 44 which locates the device below the hood and in the engine compartment. One or more mounting brackets are used to secure the filter housing at a convenient location. More importantly, the easy access enables easy removal of a filter element.

The hose 32 is shown in FIG. 3 where it connects with an inlet 46. The inlet extends upwardly in the housing which is divided into two components. The lower component 48 of the housing is covered or opened by removing a lid or cover 50. The cover 50 seals the open housing 48. The lid is provided with a seal or gasket on the interior of the lid which seals with the housing 48. This prevents loss of pressure in the system. It is preferable that the filter housing 40 be circular and incorporate the inlet pipe 46 at a central location. This enables a circular filter 52 to be installed. The filter 52 is preferably constructed with an axial passage to enable the filter to fit over the pipe 48. This introduces oil to be filtered on top of the filter element 52. The filter element is therefore provided with the O-ring seal 54 on the interior passage to fit snugly. External seals are also provided at 56. The seals 56 are preferably replicated at two or three locations on the exterior. This forces oil introduced through the upstanding pipe 46 to flow on top of the filter and percolate downwardly through the filter element 52. It is desirable that flow along the pipe 46 is prevented by one or more seal rings as observed. Likewise flow on the outer periphery of the filter element is prevented.

After filtering, oil collects in the bottom of the housing 48 and is removed through the outlet fitting 58. Fittings 46 and 58 serve similar functions. The fitting 58 enables connection with a descending flexible hose 64 shown better in FIG. 1 of the drawings. The hose 64 supports a check valve 60 preferably located close to the housing 40. At this elevated location, and again supported by a bracket 66, a small reservoir tank 70 is preferably mounted by the bracket 66 on the fender wall 44 in the same fashion as the housing 40 previously mentioned. It is constructed with a closed chamber and has a piston 72 in it. The piston 72 is spring biased downwardly to pressure the oil in the lower chamber below the piston 72. The piston 72 is selectively raised by a solenoid 74. The solenoid 74 raises the piston momentarily in accordance with a timer 76. The timer 76 is connected to obtain a signal from the engine ignition system as will be described with respect to FIG. 4 of the drawings.

Going now to FIG. 1 of the drawings, there is another valve installed in the line 64. The valve 80 is preferably located relatively close to the adapter 20. The valve 80 is biased so it is normally open with engine operation and is closed when the engine is off. The valve 80 is powered by a solenoid 82 and that in turn operates in timed fashion in accordance with a timer 84. The timer 84 is connected to the ignition system which is represented at 86, more specifically the ignition switch. Both the timers 76 and 84 operate in a timed sequence as will be described.

Figure 4:
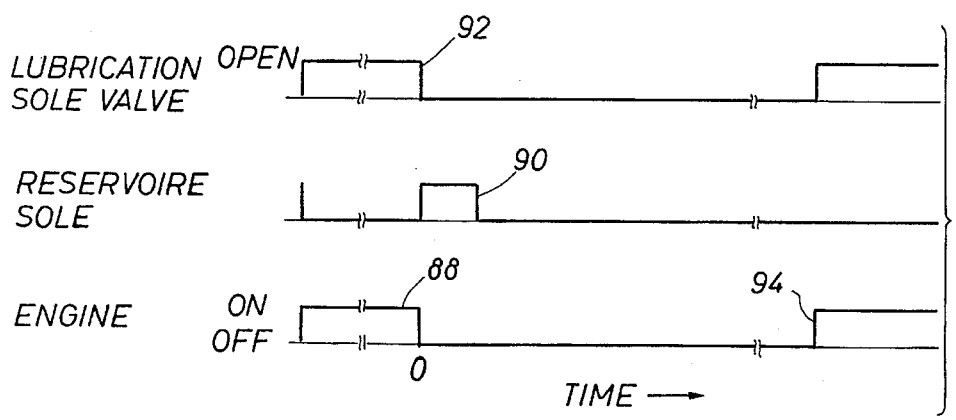
FIG. 4 is a timing chart showing operation of solenoid control valves in accordance with the present disclosure.

Going now to the timing chart of FIG. 4, three related operative conditions are shown and are tied to engine operation. As part of explaining fully the operation, the solenoids 74 and 82 are operated by the above mentioned timers and function in a time sequence with regard to engine operation. In FIG. 4 of the drawings, the curve 88 indicates engine operation. At some selected time which is indicated at zero in the time dependent graphs, the engine is switched off. When the engine is switched off, the solenoid 74 is operated to raise the piston 72 in the reservoir 70. It is helpful to raise it for perhaps two or three seconds. The solenoid 74 is operated for that short interval in accordance with timer control. This interval is represented by the curve 90 shown in FIG. 4 of the drawings. By contrast, the curve 92 is the operation cycle for the solenoid 82. Effectively, the solenoid is on when the engine is on. When the engine is turned off, the solenoid turns off. Explaining further, and assuming the engine has been not operated for several hours and lubrication in the upper parts of the engine is nil, when the user first opens the vehicle and inserts the key into the ignition, it is customary to simply switch on the ignition to fire the engine. The timer 84 switches the solenoid 82 on and delivers oil under pressure into the engine. The extent of that will be discussed below. The engine is switched on with a more rapid response in the lubrication system. Pressure in the upper parts of the engine is observed more rapidly as shown in curve 88 and especially at the step 94 at which time the engine is operated by switching the engine on. If the ignition switch is operated so electrical power is provided and then ignition is triggered perhaps three or four seconds later, that is even better. That permits oil to be introduced under pressure into the engine via the illustrated lubrication route. Thus, oil will flow to the upper parts of the engine as will be described.

At the time of switching the engine off, the reservoir solenoid is operated for two or three second as shown by curve 90. The value of that will be understood in preparing for engine operation later when the top of the engine is dry.

The oil system of the present disclosure is especially effective in that the check valve 34 prevents oil from draining from the filter housing 40. Lines 32 and 64 stay filled with oil. Both lines maintain a substantial quantity of oil in them. Oil likewise is saved in the housing 40. At the moment the ignition is switched off, the solenoid 74 is operated. This increases the amount of oil stored in the reservoir 70. When that occurs, additional oil is stored in the upper parts of the engine lubrication system. This creates a hydrostatic head for the oil in the system. Moreover, when the solenoid 74 first operates and then releases, forming the operative sequence shown at 90 in FIG. 4, the oil is provided with added pressure. The oil does not drain because the valve 80 is closed. The valve 80 is closed by operation of the solenoid 82, note the curve 92. After the passage of an overnight interval, or perhaps several days, the automobile is again used. At that time, when the engine is switched on by inserting the key in the ignition, the application of accessory electrical power through the ignition switch can be used to open the solenoid valve 80. This will then deliver oil from reservoir 70 through the hose 64, the valve 80 and input oil into the engine lubrication system. Effectively, the reservoir provides a pressure boost which serves as a pressure source alternative to the oil pump 17. When that occurs, lubricant pressure is delivered without engine operation. This avoids the first few revolutions of engine operation when the engine is dry. Rather, the pressure boost which depends on operation of the solenoid valve 80 lubricates the upper portions of the engine when the automobile driver is somewhat patient and permits two or three seconds to pass. In that interval, oil pressure is delivered from the reservoir 70 and from the storage capacity of the supply line 64 and into the upper parts of the engine for lubrication prior to engine operation. Cold stating of the engine in a dry condition is thus prevented or substantially reduced.

The present invention is easily installed. As shown in FIGS. 2 and 3, the filter housing 40 and the reservoir 70 are fastened at convenient locations in the engine compartment typically mounted on the fender wall 44. The hoses are installed extending to the adapter 20. The adapter 20 shown in FIG. 2 is threaded into the engine on replacement of the sacrificial cartridge filter. When installed, oil is added to the system to the requisite amount. The size or volume of hoses 32 and 34 along with reservoir 70 can be calculated so that one additional quart of lubricating oil is required for the system. This means that a change of engine oil is more costly by one quart, but it also suggests that lubrication of the engine occurs sooner to reduce cold starting sludge and lasts longer because there is one additional quart involved in lubrication operation. The filter 52 is plugged into housing 40. The filter 52 is sealed on the interior and exterior. When sealed, oil flow is directed through the cartridge filter 52. To change the filter, the filter 52 is merely lifted out after removing the top or lid 50. Replacement is done with periodic maintenance of the vehicle.

Figure 5:
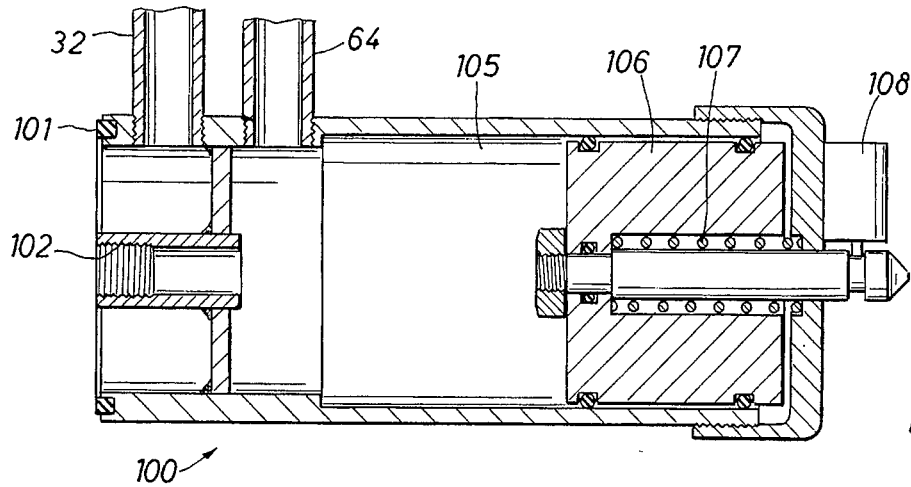
FIG. 5 shows a combined reservoir and adapter.

FIG. 5 shows the combined adapter and reservoir 100. The seal 101 seals the adapter 100 to the engine. Connection 102 screws to the engine the same way as a conventional oil filter. Oil flow from the engine oil pump flows through the hose 32 to the filter. Return oil from the filter is supplied by the hose 64 and oil then enters the engine through the pipe 102. The reservoir 105 is filled with oil by oil pressure developed when the engine is running. Piston 106 compresses spring 107 as oil pressure is developed. Solenoid 108 is engaged and holds piston 106 as soon as ignition is turned off. When ignition key is turned on, solenoid 108 is retracted, allowing spring to force oil through pipe 102 to the engine.

Figure 6:
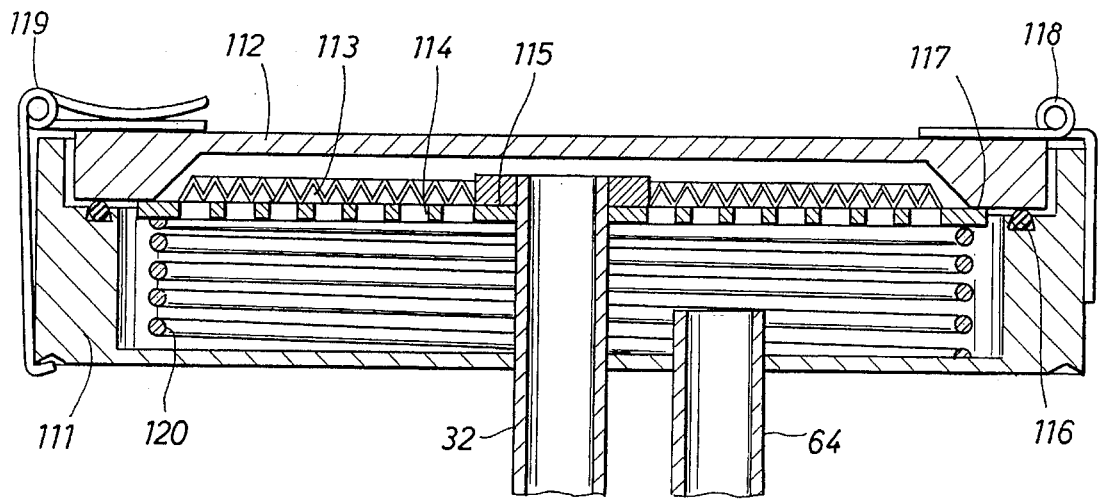
FIG. 6 shows a permanent filter.
Figure 7:
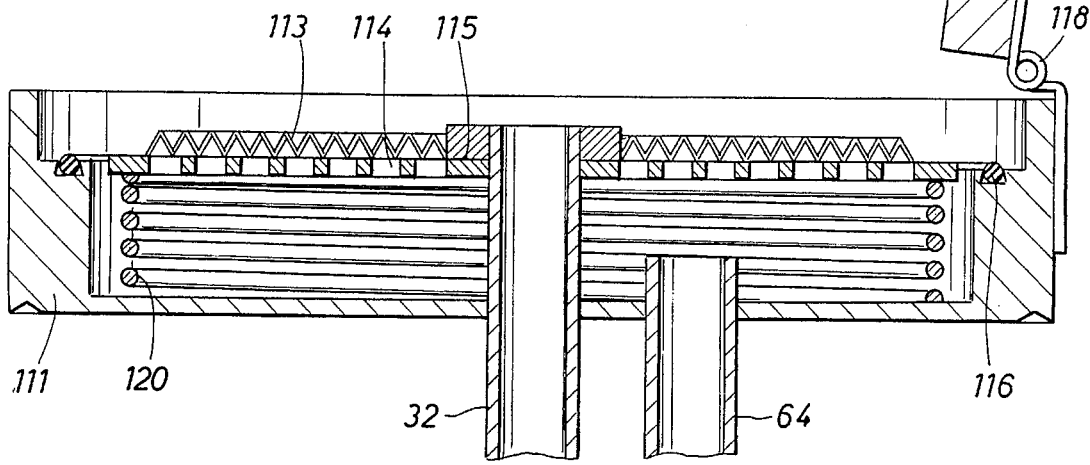
FIG. 7 shows a lid and filter housing.

FIG. 6 shows a permanent filter housing 111, retractable lid 112, filter element 113, perforated plate 114, seals 115, 116 and 117, hinge 118, spaced latches 119, spring 120, pipe 32, and pipe 64. Oil from engine enters pipe 32 and oil is disbursed evenly on filter element 113 and is cleaned. Perforated plate 114 is a backing for filter element 113 allowing the filter element to maintain its shape. If filter element 113 becomes clogged and can no longer supply engine with sufficient oil, engine oil pressure overcomes the spring 120. This allows oil to bypass seals 115 and 117, insuring sufficient engine oil to the engine even though it is dirty. The line 64 delivers engine oil back to the engine. Lid 112 seals oil pressure from the atmosphere by the latches 119 compressing the seal 116. Hinge 118 allows the lid to open fully for easy access to element 113. FIG. 7 shows the lid 112 open for easy access to the element 113.

While the foregoing is directed to the preferred embodiment, the scope thereof is determined by the claims which follow:

What is claimed is:

1. A lubrication filter system adapted for use with an automobile engine in an engine compartment provided with a pre-existent threaded fitting for a disposable cartridge filter on the engine wherein the system comprises:

(a) an adapter for threaded connection to an automobile engine in lieu of the replaceable cartridge filter normally placed in the engine oil lubrication system wherein said adapter includes adapter inlet and adapter outlet connections;

(b) a first oil flow line extending from said adapter outlet connection and connected by means of a filter housing inlet fitting with a raised filter housing adapted to be installed at an elevated location within the engine compartment wherein said housing receives a removable lubricant filter and has a filter housing outlet fitting; and (c) a second oil flow line extending between said adapter inlet connection and said filter housing outlet fitting, wherein said flow lines incorporate a valve system to deliver oil therethrough, and wherein said valve system prevents drainage of oil from said filter housing by means of a check valve in said first flow line and by closing a solenoid controlled valve in said second flow line upon switching off said automobile engine, and wherein said second flow line returns filtered oil through said adapter to the engine; and, reservoir means connected to said second oil flow line at a point between said filter housing outlet fitting and said solenoid controlled valve for storing a pressurized quantity of filtered oil.

2. The apparatus of claim 1 wherein said filter housing incorporates a mounting bracket for connecting said housing within the engine compartment.

3. The apparatus of claim 1 wherein said filter housing has a removable upper cover over a lower portion and said cover fits on said lower portion to define a leak proof chamber for receiving a removable and disposable cartridge filter fitting therein, and said filter housing incorporates fluid flow passages so oil is forced to flow through said filter for filtration.

4. The apparatus of claim 3 wherein said reservoir means comprises a pressure boost means which serves as a pressure source alternate to an oil pump of said automobile engine.

5. The apparatus of claim 4 wherein said reservoir means includes
   (a) a closed cylinder;
   (b) a piston in said cylinder;
   (c) a bias force forming device acting to bias said piston to form pressure on oil in said cylinder;
   (d) an electrically operated device to move said piston momentarily to decrease pressure on oil in said cylinder and then restore pressure to the oil in said cylinder.

6. The apparatus of claim 5 wherein said reservoir means has only one outlet.

7. The apparatus of claim 1 further comprising a timer connected with said solenoid controlled valve such that opening and closing of said solenoid controlled valve is timed in in response to starting and stopping of the automobile engine, respectively.

8. The apparatus of claim 1 wherein said reservoir means comprises a cylinder with a piston therein, and means for biasing said piston in a direction toward said reservoir to pressurize oil contained within said reservoir.

9. The apparatus of claim 1 wherein said reservoir means further comprises a reservoir solenoid operably connected to said piston so that said reservoir solenoid operates selectively to move said piston in a direction away from said reservoir or to hold said piston in a fixed positioned against the force of said biasing means when in an activated state to increase or maintain a capacity of said reservoir, respectively, and further so that said reservoir solenoid is operable to permit free movement of said piston under the force of said biasing means toward said reservoir to reduce the capacity of the reservoir when in a deactivated state.

10. The apparatus of claim 9 wherein said biasing means comprises a bias spring bearing against said piston.

11. The apparatus of claim 10 including a solenoid timer for activating and deactivating said reservoir solenoid thereby controlling the movement of said piston.

12. A lubrication filter system adapted for use with an automobile engine in an engine compartment provided with a pre-existing threaded fitting for a disposable cartridge filter on the engine wherein the system comprises:

(a) an adapter for threaded connection to an automobile engine in lieu of the replaceable cartridge filter normally placed in the engine oil lubrication system, wherein said adapter includes adapter inlet and adapter outlet connections;

(b) a first oil flow line extending from said adapter outlet connection and connected by means of a filter housing inlet fitting with a separate filter housing adapted to be installed at an elevated location within the engine compartment, wherein said housing:
   (i) receives a removable lubricant filter,
   (ii) has a removable upper cover over a lower portion and said cover fits on said lower portion to define a leak proof chamber for receiving a removable and disposable cartridge filter fitting therein,
   (iii) incorporates fluid flow passages so oil is forced to flow through said filter for filtration, and
   (iv) has a filter housing outlet fitting;

c) a second oil flow line extending between said adapter inlet connection and said filter housing outlet fitting, wherein said flow lines incorporate a valve system to deliver oil therethrough, and wherein said valve system prevents drainage of oil from said filter housing by means of a first valve means in said first flow line and a second valve means in said second flow line, and wherein said second flow line returns filtered oil through said adapter to the engine; and (d) a filtered oil storage reservoir which connects to said second flow line at a point between said filter housing outlet fitting and said second valve means, wherein said filtered oil storage reservoir includes
   (i) a closed cylinder,
   (ii) a piston in said cylinder,
   (iii) a bias device acting to bias said piston to form pressure on oil in said cylinder,
   (iv) an electrically operated device to move said piston momentarily to decrease pressure on oil in said cylinder and then restore pressure to the oil in said cylinder.

13. The apparatus of claim 12 wherein said reservoir has only one outlet.

14. The apparatus of claim 12 wherein:
(a) said first flow line is an outlet flow line from said adapter to said filter housing;
(b) said second flow line is a return flow line from said filter housing to said adapter;
(c) said said first valve means is a check valve for preventing outlet flow line drain into said adapter when the automobile engine is off; and
(d) said second valve means is a solenoid controlled valve in said return flow line adapted to close to prevent flow from said return flow line into said adapter when said automobile engine is off.

15. The apparatus of claim 14 further comprising a timer connected with said solenoid controlled valve such that opening and closing of said solenoid controlled valve is timed in in response to starting and stopping of the automobile engine, respectively.

* * * * *